United States Patent [19]

Kelledes et al.

[11] Patent Number: 5,086,264
[45] Date of Patent: Feb. 4, 1992

[54] MOTOR TOQUE COMPENSATION OF AN INDUCTION ELECTRIC MOTOR BY ADJUSTING A SLIP COMMAND DURING PERIODS OF SUPPOSED CHANGE IN MOTOR TEMPERATURE

[75] Inventors: William L. Kelledes, Brighton; Don K. St. John, Livonia, both of Mich.

[73] Assignee: Eaton Corporation, Cleveland, Ohio

[21] Appl. No.: 542,266

[22] Filed: Jun. 22, 1990

[51] Int. Cl.⁵ .................................................. H02P 5/41
[52] U.S. Cl. ..................................... 318/798; 318/802; 318/806; 318/811
[58] Field of Search ............... 318/490, 798, 799, 800, 318/801, 802, 806, 807, 808, 810, 811, 812, 823, 826, 708, 713, 714, 715

[56] References Cited

U.S. PATENT DOCUMENTS

| | | | |
|---|---|---|---|
| 4,063,112 | 12/1977 | Dumbeck | 307/116 |
| 4,160,940 | 7/1979 | Wolf | 318/803 |
| 4,194,129 | 3/1980 | Dumbeck | 307/149 |
| 4,527,214 | 7/1985 | Hattori et al. | 361/96 |
| 4,547,826 | 10/1985 | Premerlani | 361/25 |
| 4,629,035 | 12/1986 | Tanahashi et la. | 318/798 X |
| 4,672,288 | 6/1987 | Abbondanti | 318/803 |
| 4,689,543 | 8/1987 | Huckey | 318/798 |
| 4,779,708 | 10/1988 | Sasao et al. | 187/119 |
| 4,914,386 | 4/1990 | Zocholl | 318/490 X |

Primary Examiner—Bentsu Ro
Attorney, Agent, or Firm—Krass & Young

[57] ABSTRACT

The present invention maintains constant torque in an inverter driven AC induction motor during variations in rotor temperature. It is known that the torque output of a given AC induction motor is dependent upon rotor temperature. At rotor temperatures higher than the nominal operating condition the rotor impedance increases, reducing the rotor current and motor torque. In a similar fashion, the rotor impedance is reduced resulting in increased rotor current and motor torque when the rotor temperature is lower than the nominal operating condition. The present invention monitors the bus current from the DC supply to the inverter and adjusts the slip frequency of the inverter drive to maintain a constant motor torque. This adjustment is based upon whether predetermined conditions implying increased rotor temperature or decreased rotor temperature exist for longer that a predetermined interval of time.

13 Claims, 3 Drawing Sheets

MOTOR TOQUE COMPENSATION OF AN INDUCTION ELECTRIC MOTOR BY ADJUSTING A SLIP COMMAND DURING PERIODS OF SUPPOSED CHANGE IN MOTOR TEMPERATURE

GOVERNMENT RIGHTS STATEMENT

The United States government has rights in this invention pursuant to contract no. DE-AC08-84NV10344 awarded by the U.S. Department of Energy.

TECHNICAL FIELD OF THE INVENTION

The field of the present invention is that of AC induction motor control and more particularly such control in a inverter motor drive system.

BACKGROUND OF THE INVENTION

Inverter driven control systems for AC induction motors are known in the art. Such systems are generally employed in cases such as electric vehicles where the electric power for driving the motor comes from a DC source such as a battery. It is known that AC motors are relatively lighter, less expensive, more efficient and more rugged than DC motors of the same power rating. The lack of slip rings and brushes in AC induction motors make them better suited to hostile environments and less likely to generate sparks which may be hazardous. The provision of an inverter having a sophisticated control circuit between the battery supply and the AC motor permits easy control of the AC motor.

It is known in the art that the rotor impedance increases with increasing temperature. This temperature dependent rotor impedance results in differing motor current based upon temperature. The rotor temperature may vary depending upon the conditions of use and in particular is likely to increase during initial use of the motor. As a result there is an uneven application of torque for the same drive to the motor based upon the motor conditions. It is known in the art to provide a temperature sensor on the rotor and to change the motor drive to compensate for this based upon the measured temperature. These systems tend to be costly and have reliability problems.

It is therefore a need in the art to provide a less costly and more reliable manner of compensating the motor drive to provide constant torque for differing rotor temperatures.

SUMMARY OF THE INVENTION

The present invention operates to vary the motor drive to compensate for changes in torque due to differing rotor temperatures. This compensation is based on an easily measured quantity that serves as a substitute for the rotor temperature. This easily measured quantity is the DC current drawn by the inverter.

The torque produced by an AC induction motor is proportional to the slip frequency of the motor. This slip frequency is the difference in frequency between the motor speed and the motor drive frequency. In this invention the slip frequency is adjusted under certain specified conditions based upon the DC current drawn. This adjustment is based upon the slip frequency normally computed for the AC induction motor drive by the inverter. This adjustment serves to compensate for torque changes based upon rotor temperature.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
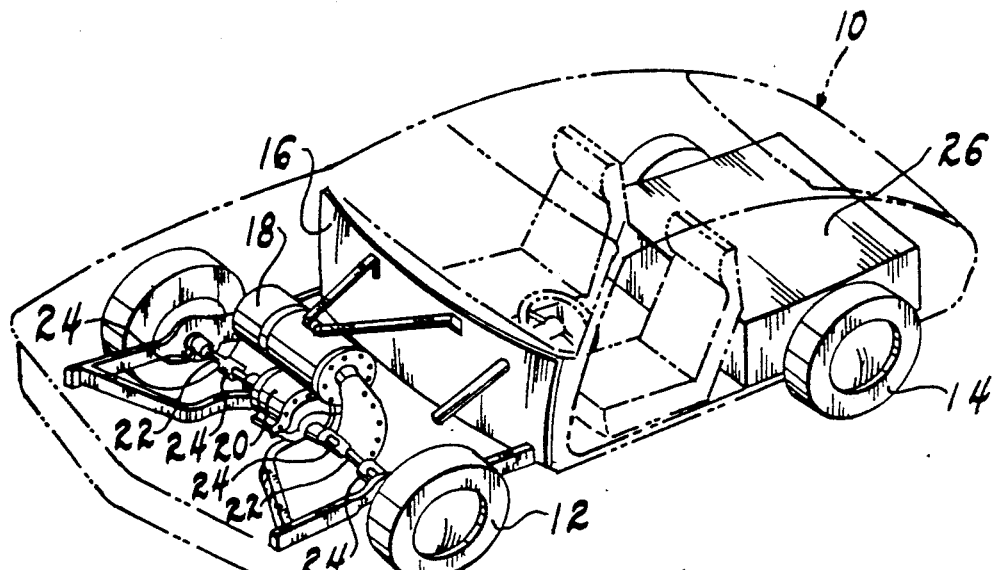
FIG. 1 is a perspective phantom view of an automobile incorporating the preferred embodiment of the invention.

FIG. 1 shows the packaging of the present invention within an electric vehicle 10. Electric vehicle 10 is conventionally configured, having driven front wheels 12 and free rear wheels 14. An engine compartment, defined by the area forward of a firewall 16, contains a transversely mounted three-phase induction motor 18 which operates to drive wheels 12 through a two-speed transmission 20, drive shafts 22 and interconnecting u-joints 24. Motor 18 and transmission 20 are integrally formed within a common housing. The details of the front suspension have been deleted for the sake of simplicity. The mounting of motor 18 and transmission 20 as well as the independent front end suspension of electrical vehicle 10 is so well known in the art so as to require no elaboration here.

A ventilated compartment 26 disposed within electrical vehicle 10 behind the driver and passenger seats contains a 144 volt DC battery pack as well as an inverter and most of the control circuitry. Motor 18 and compartment 26 are electrically interconnected by appropriately sized cables (not illustrated). Additionally, provision must be made to periodically connect the battery of electrical vehicle 10 with a source of charging current such as at the owner's home.

The present invention can be applied to applications other than electric vehicles. FIG. 1 is intended only as an aid to the reader in conceptualizing the packaging as it would appear in a typical commuting passenger vehicle. The details of the illustrated arrangement are therefor not to be considered limiting in any sense.

Figure 2:
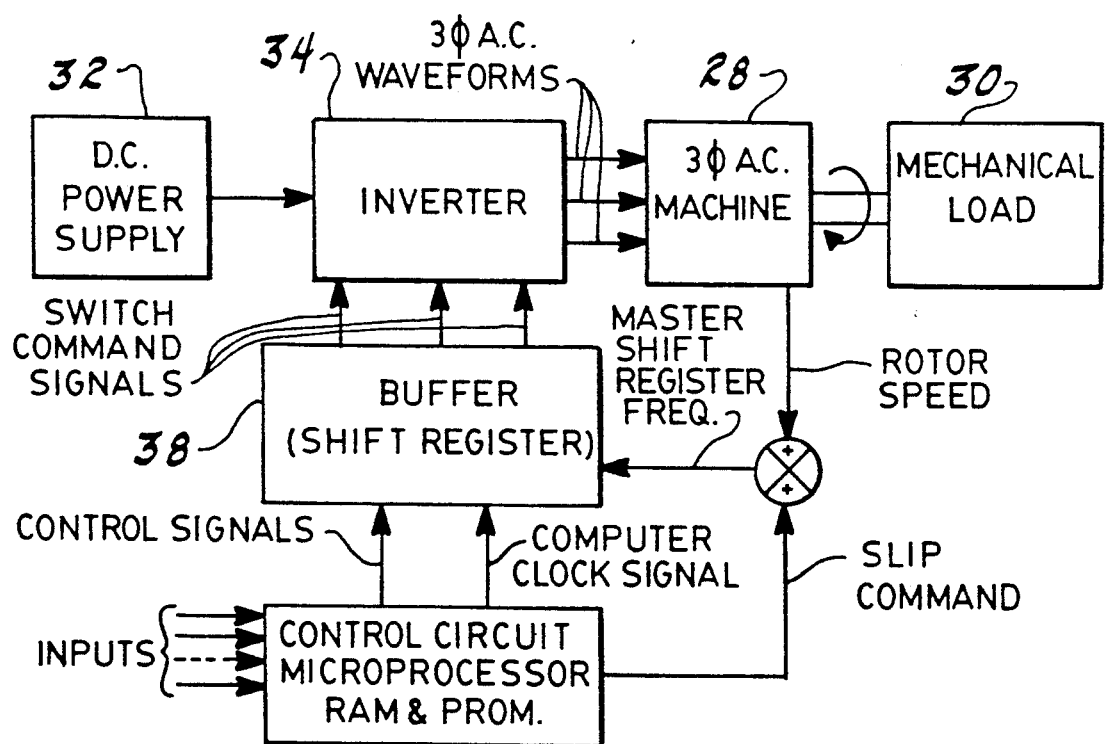
FIG. 2 is a block diagram of the pulse width modulated inverter control and its implementation within the drive train of the automobile of FIG. 1.

FIG. 2 illustrates a simplified block diagram of the present invention. A three-phase AC machine 28 drives a mechanical load 30 and is energized by a D.C. power supply 32 through an intermediate inverter 34. Inverter 34 converts direct current from D.C. power supply 32 into threephase AC wave forms. Inverter 34 receives switch command signals from a control circuit 36 through an intermediate buffer, here a shift register 38. The duty cycle and wave shape data of the three-phrase AC wave forms are determined by the switch command signals which are derived from a plurality of parametric inputs into control circuit 36.

The circuit of FIG. 2 operates as follows. Control circuit 36, which contains a microprocessor, random access memory (RAM) and programmable read only memory (PROM), receives various parametric inputs such as voltage and current levels as well as driver torque demand in the case where the present invention is applied to electrical vehicle 10. Control circuit 36 then serves to determine the optimum slip and duty cycle information for a given torque demand as a function of the inputs and look-up tables contained in memory. Control signals containing duty cycle and wave shape data are then transferred to buffer 38 at a rate determined by a clock within control circuit 36. The control signals are momentarily stored in buffer 38 while a slip command signal from control circuit 36 is summed with a signal from AC machine 28 representing rotor speed, resulting in a master shift register frequency signal representative of the AC machine stator frequency. The control signals stored in buffer 38 are then synchronized with AC machine 28 and transferred to inverter 34 in a form of properly phased switch command signals.

This asynchronous data transfer technique permits the microprocessor in control circuit 36 to be non-dedicated and used for ancillary purposes while not generating wave forms. Such uses, in the preferred embodiment of the invention, are the monitoring of system limits, executing drive diagnostic routines, establishing operator readout, transforming driver commands into output torque commands and optimizing volts per hertz (V/Hz) during steady state conditions.

The illustrative embodiment of the invention is an electrical vehicle 10. AC machine 28 therefore corresponds to three-phase induction motor 18, but it is contemplated that AC machine 28 could also be a regenerative absorber or the like. Likewise, mechanical load 30 represents the torque applied by and to motor 18 by electrical vehicle 10, but could represent other mechanical loads.

One of the many quantities periodically computed by control circuit 36 during its operation to control AC machine 28 is the slip command. A control loop within control circuit 36 operates to compute the slip command. The compensation for temperature of this invention occurs as a portion of the operation of control circuit 36. As described above control circuit 36 preferably consists of a microprocessor, and memory in the form of random access memory (RAM) and programmable read only memory (PROM). Control of the slip command is thus preferably executed as a part of the operation of control circuit 36. This invention involves two cases of modification of the slip command based upon particular conditions and the lapse of time. The two cases are increasing rotor temperature and decreasing rotor temperature. These modifications of the slip command are preferably subroutines to the slip command operation of control circuit 36. These two subroutines are illustrated at subroutine 100 in FIG. 3 and subroutine 200 in FIG. 4.

Subroutine 100 is employed during times of increasing rotor temperature. Subroutine 100 is begun by a start block 101. Subroutine 100 first tests to determine whether or not the bus current is less than the maximum bus current, the motor speed is greater than a predetermined base speed and the torque demanded equals the maximum torque demand (decision block 102). In the event that all of these conditions are satisfied, then subroutine 100 increments a delay counter (processing block 103).

Subroutine 100 next tests to determine whether or not the count of the delay counter equals or exceeds a predetermined count (decision block 104). In the event that the delay count equals or exceeds this predetermined count, then the slip constant employed to produce the slip commands is incremented (processing block 105). This process takes place by adding a small amount to the slip constant. Subroutine 100 next tests to determine whether or not the slip constant is greater than or equal to its maximum permitted value (decision block 106). In the event that the slip constant is greater than its permitted maximum value, subroutine 100 sets this slip constant at the maximum permitted value (processing block 107). Whether or not the slip constant is greater than its maximum value, subroutine 100 is complete and is executed by a return block 108.

In the event that the count of the delay counter is less than the predetermined count, then subroutine 100 is complete and is exited by a return block 108.

On the other hand, it is possible that not all of the three conditions of decision block 102 are satisfied. In this case the delay counter is decremented (processing block 109). Subroutine 100 then tests to determine whether or not the delay counter has been reduced to less than zero (decision block 110). In the event that the delay counter has been reduced to less than zero, subroutine 100 sets the delay counter equal to zero (processing block 112). Regardless of whether or not the delay counter has been set to less than zero, subroutine 100 is complete and is exited by a return block 108.

Figure 3:
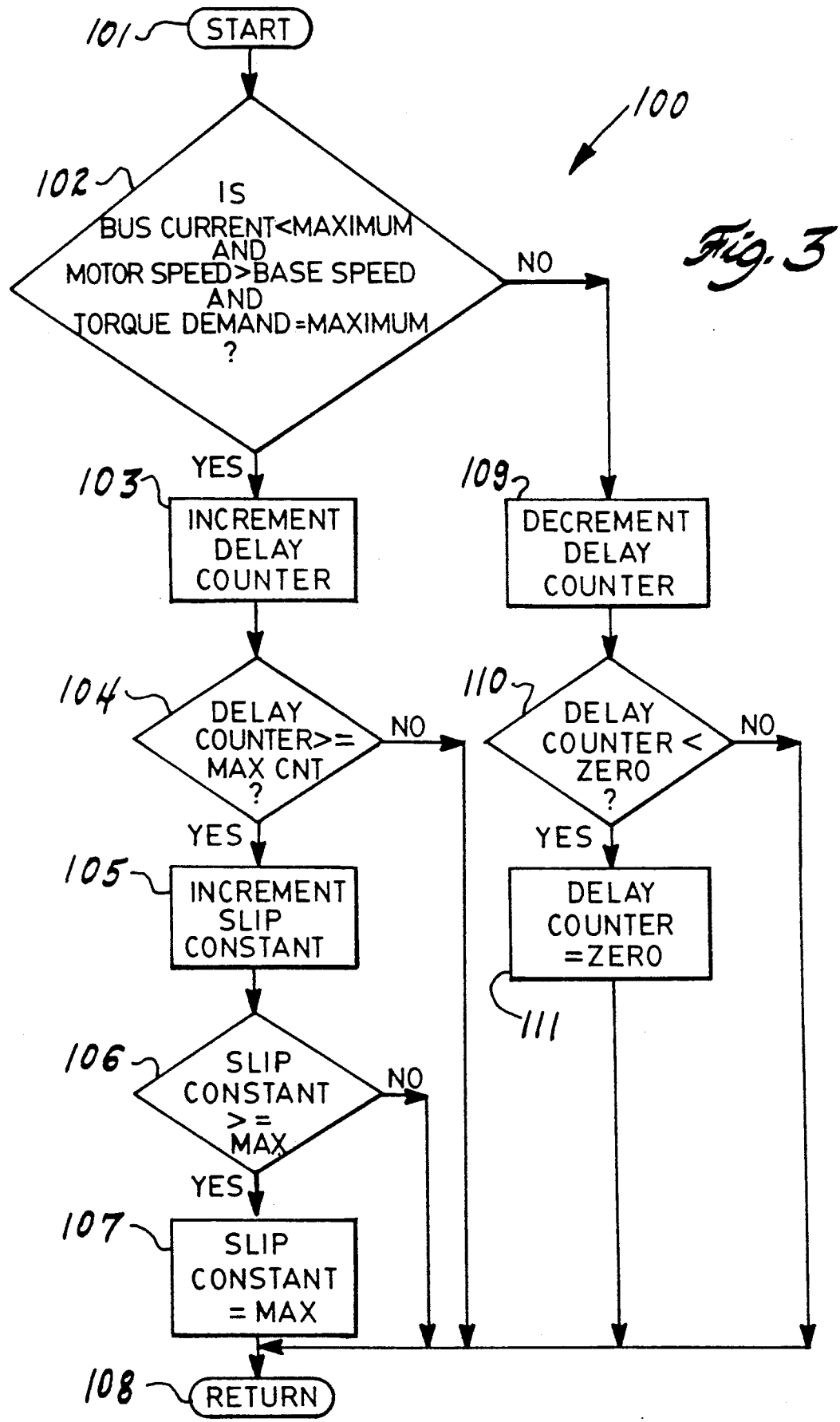
FIG. 3 is a flow chart of a portion of the slip frequency control for the case of increasing rotor temperature in accordance with the present invention.

Subroutine 100 illustrated in FIG. 3 is repeatedly performed during operation of control circuit 36 each time the slip command is computed. If the conditions of decision block 102 are met for longer than the time required to increment the delay counter to reach the predetermined count, then the slip constant is increased. Such an increase may take place repeatedly if the conditions continue to exist up until the slip command equals the predetermined maximum slip command. The conditions may sometimes not be met, in which case the delay counter is decreased. Each time this is done increases the time required for the delay counter to again reach its maximum value. Thus the slip command may be adjusted during some cycles of subroutine 100 and not during others.

In general this subroutine 100 serves to increase the slip command, thereby increasing the torque produced by motor 18 when a maximum torque demand lasts for longer than the time needed to increment the delay counter to its maximum count. This increase in the slip command takes place generally during times when the rotor temperature is likely to increase. Such an increase in rotor temperature increases its impedance and would tend to reduce rotor current and torque but for the compensation applied to the slip command.

Figure 4:
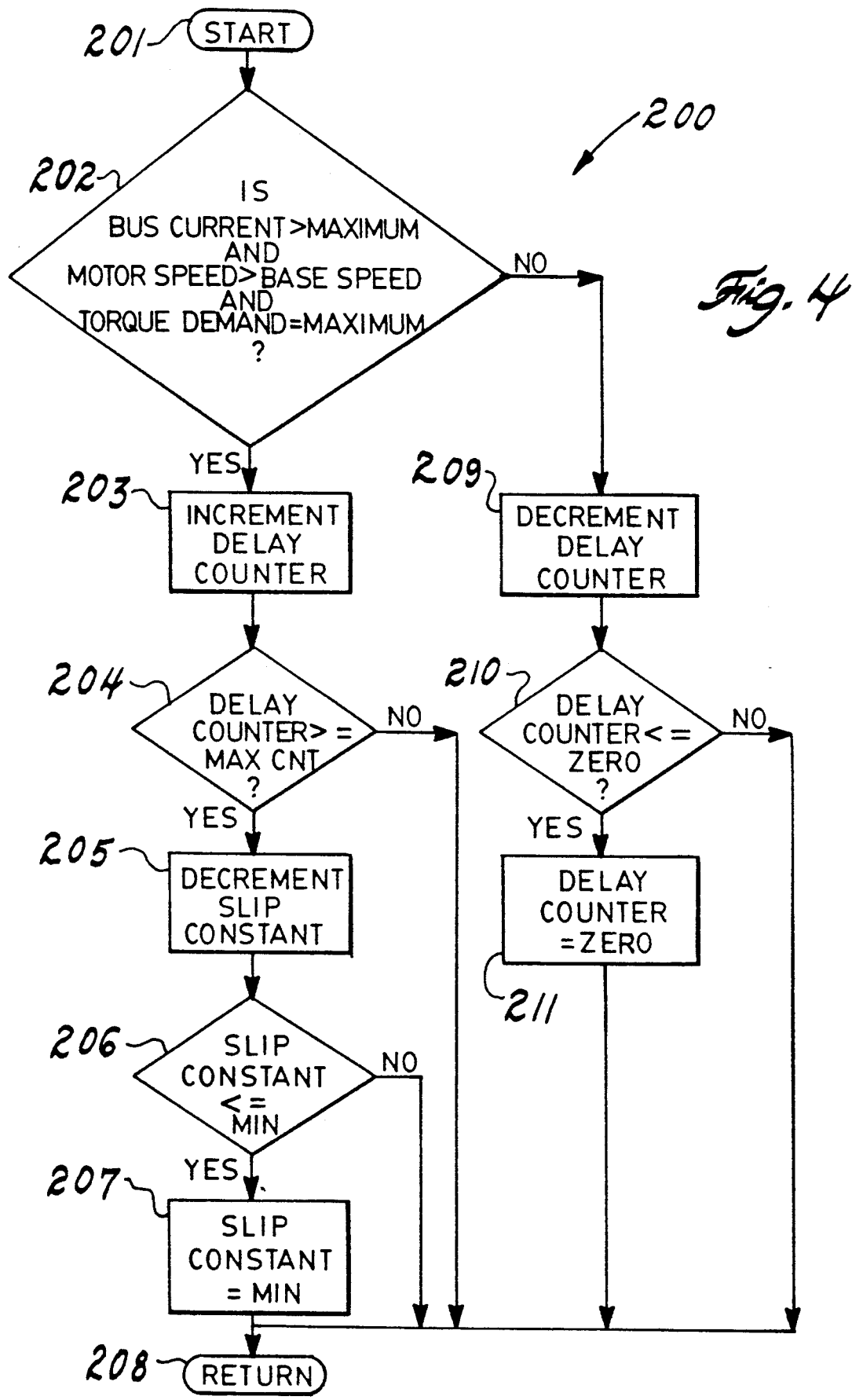
FIG. 4 is a flow chart of a portion of the slip frequency control for the case of decreasing rotor temperature in accordance with the present invention.

Subroutine 200 illustrated in FIG. 4 is similar to subroutine 100 except that it is applicable during times of decreasing rotor temperature. Subroutine 200 is begun by a start block 201. Subroutine 200 first tests to determine whether or not the bus current is greater than the maximum bus current, and the motor speed is greater than a predetermined base speed and the torque is equal to the maximum torque demand (decision block 202). In the event that all of these conditions are satisfied, than subroutine 200 increments a delay counter (processing block 203).

Subroutine 200 next tests to determine whether or not the count of the delay counter equals or exceeds a predetermined count (decision block 204). In the event that the delay count equals or exceeds this predetermined count, then the slip constant employed to produce the slip commands is decremented (processing block 205) by subtracting a small amount from the slip constant.

Subroutine 200 next tests to determine whether or not the slip constant is less than or equal to its minimum permitted value (decision block 206). In the event that the slip constant is less than its minimum permitted value, subroutine 200 sets this slip constant at the minimum permitted value (processing block 207). Whether or not the slip constant is less than its minimum value, subroutine 200 is complete and is executed by a return block 208.

In the event that the count of the delay counter is less than the predetermined count, then subroutine 200 is complete and is exited by a return block 208.

On the other hand, it is possible that not all of the three conditions of decision block 202 are satisfied. In this case the delay counter is decremented (processing block 209). Subroutine 200 then tests to determine whether or not the delay counter has been reduced to less than zero (decision block 210). In the event that the delay counter has been reduced to less than zero, subroutine 200 sets the delay counter equal to zero (processing block 212). Regardless of whether or not the delay counter has been set to less than zero, subroutine 200 is complete and is exited by a return block 208.

Subroutine 200 illustrated in FIG. 4 is repeatedly performed during operation of control circuit 36 each time the slip command is computed. If the conditions of decision block 202 are met for longer than the time required to increment the delay counter to reach the predetermined count, then the slip constant is decreased and may be repeatedly decreases if the conditions continue to exist up until the slip command equals the predetermined minimum slip command. Otherwise the delay counter is decreased, thereby increasing the time required before the next adjustment of the slip command.

In general this subroutine 200 serves to decrease the slip command, thereby decreasing the torque produced by motor 18 when the maximum torque is demanded and the bus current exceeds its maximum for longer than the time needed to increment the delay counter to its maximum count. This decrease in the slip command takes place generally during times when the rotor temperature is likely to decrease thereby decreasing the rotor impedance. Without compensation this would tend to increase the rotor current and torque.

Thus the slip command may be adjusted during some operations of the system in a manner which tends to compensate for the changes in motor current and torque caused by temperature related changes in the rotor impedance. This technique is advantageous because it does not require an external temperature sensor. This technique rather employs system parameters available to control circuit 36. By proper computation within control circuit 36, compensation of the slip command based upon an estimate of rotor temperature is made.

It should be understood that control circuit 36 performs many other operations in control of AC machine 28 which are known in the art and which are not relevant to the present invention. Further description of these other operations may be found in U.S. Pat. No. 4,316,132 issued Feb. 16, 1982 entitled "PWM Inverter Control and the Application Thereof Within Electrical Vehicles" and assigned to the assignee of this application. Detailed description of these other operations are therefore omitted.

We claim:

1. An electric motor control system comprising:
   a direct current power supply;
   an alternating current induction electric motor;
   a motor speed detector coupled to said alternating current induction electric motor for generating a signal representing the speed of said alternating current induction electric motor;
   an inverter coupled to said direct current power supply via a direct current power bus and coupled to said alternating current induction electric motor and said motor speed detector for supplying a modulated power output from said direct current bus to said alternating current induction electric motor at a selectable frequency equal to the sum of the speed of said alternating current induction electric motor and a slip command and a selectable voltage modulation for control of the rate of speed and the torque produced by said alternating current induction electric motor; and
   a control circuit connected to said inverter, said direct current power bus and said motor speed detector operative to
      monitor the current delivered through said direct current power bus, the speed of said alternating current induction motor and the torque demanded of said alternating current induction motor,
      supply a slip command to said inverter, and
      periodically adjust said slip command supplied to said inverter during periods of supposed change in motor temperature corresponding to said monitored current delivered through said direct current power bus, the speed of said alternating current induction motor and the torque demanded of said alternating current induction motor to compensate for torque changes because of changes in motor temperature.

2. The electric motor control system as claimed in claim 1, wherein;
   said control circuit is operative to periodically adjust said slip command by
      increasing said slip command if said bus current is less than a maximum bus current, the speed of said alternating current induction electric motor is greater than a predetermined base speed and the torque demanded is equal to a maximum torque demand for longer than a predetermined period of time.

3. The electric motor control system as claimed in claim 2, wherein:
   said control circuit is further operative to adjust said slip command by
      setting said slip command at a maximum slip command if said slip command is increased to greater than said maximum slip command.

4. The electric motor control system as claimed in claim 1, wherein:
   said control circuit is operative to periodically adjust said slip command by
      decreasing said slip command if said bus current is greater than a maximum bus current, the speed of said alternating current induction electric motor is greater than a predetermined base speed and the torque demanded is equal to a maximum torque demand for longer than a predetermined period of time.

5. The electric motor control system as claimed in claim 4, wherein:
   said control circuit is further operative to adjust said slip command by setting said slip command at a minimum slip command if said slip command is decreased to less than said maximum slip command.

6. An electric motor control system comprising:
a direct current power supply;
an alternating current induction electric motor;
a motor speed detector coupled to said alternating current induction electric motor for generating a signal representing the speed of said alternating current induction electric motor;
an inverter coupled to said direct current power supply via a direct current power bus and coupled to said alternating current induction electric motor and said motor speed detector for supplying a modulated power output from said direct current bus to said alternating current induction electric motor at a selectable frequency equal to the sum of the speed of said alternating current induction electric motor and a slip command and a selectable voltage modulation for control of the rate of speed and the torque produced by said alternating current induction electric motor; and
a control circuit connected to said inverter, said direct current power bus and said motor speed detector operative to
monitor the bus current, the speed of said alternating current induction electric motor and the torque demanded of said alternating current induction electric motor,
supply a slip command to said inverter,
increase said slip command if said bus current is less than a maximum bus current, the speed of said alternating current induction electric motor is greater than a predetermined base speed and the torque demanded is equal to a maximum torque demand for longer than a predetermined period of time, and
decrease said slip command if said bus current is greater than said maximum bus current, the speed of alternating current induction electric motor is greater than said predetermined base speed and the torque demanded is equal to said maximum torque demand for longer than said predetermined period of time.

7. The electric motor control system as claimed in claim 6, wherein:
said control circuit is further operative to
increase said slip command to not more than at a predetermined maximum slip command.

8. The electric motor control system as claimed in claim 6, wherein:
said control circuit is further operative to
decrease said slip command to no less than a predetermined minimum slip command.

9. A method of control of an alternating current induction electric motor control system via an inverter from a direct current power supply, comprising the steps of:
measuring the speed of the alternating current induction electric motor;
modulating the power output from the direct current supply to the alternating current induction electric motor at a selectable frequency equal to the sum of the speed of said alternating current induction electric motor and a slip command and a selectable voltage modulation for control of the rate of speed and the torque produced by the alternating current induction electric motor;
monitoring the current delivered by the direct current power supply, the speed of the alternating current induction motor and the torque demanded of the alternating current induction motor;
generating a slip command; and
periodically adjusting said slip command during periods of supposed change in motor temperature corresponding to said monitored current delivered by said direct current power supply the speed of the alternating current induction motor and the torque demanded of the alternating current induction motor to compensate for torque changes because of changes in motor temperature.

10. The method claimed in claim 9, wherein:
said step of periodically adjusting said slip command includes
increasing said slip command if the current delivered by the direct current power supply is less than a maximum current, the speed of the alternating current induction electric motor is greater than a predetermined base speed and the torque demanded is equal to a maximum torque demand for longer than a predetermined period of time.

11. The method claimed in claim 10, wherein:
said step of periodically adjusting said slip command further includes
setting said slip command at a maximum slip command if said slip command is increased to greater than said maximum slip command.

12. The method claimed in claim 9, wherein:
said step of periodically adjusting said slip command includes
decreasing said slip command if said current delivered by the direct current power supply is greater than a maximum current, the speed of the electric motor is greater than a predetermined base speed and the torque demanded is equal to a maximum torque demand for longer than a predetermined period of time.

13. The method claimed in claim 12, wherein:
said step of periodically adjusting said slip command further includes
setting said slip command at a minimum slip command if said slip command is decreased to less than said minimum slip command.

* * * * *